(12) United States Patent
Tryhubczak et al.

(10) Patent No.: US 10,725,532 B1
(45) Date of Patent: Jul. 28, 2020

(54) DATA STORAGE SYSTEM POWER SHEDDING FOR VAULT

(71) Applicant: EMC IP Holding Company LLC, Hopkinton, MA (US)

(72) Inventors: James C. Tryhubczak, Cumberland, RI (US); Wuck Foo Wong, Framingham, MI (US)

(73) Assignee: EMC IP Holding Company LLC, Hopkinton, MA (US)

( * ) Notice: Subject to any disclaimer, the term of this patent is extended or adjusted under 35 U.S.C. 154(b) by 132 days.

(21) Appl. No.: 15/956,424

(22) Filed: Apr. 18, 2018

(51) Int. Cl.
| | | |
|---|---|---|
| *G06F 1/3296* | (2019.01) | |
| *G06F 1/26* | (2006.01) | |
| *G06F 1/30* | (2006.01) | |
| *G06F 1/3206* | (2019.01) | |
| *G06F 11/14* | (2006.01) | |
| *G06F 3/06* | (2006.01) | |
| *G06F 1/3287* | (2019.01) | |

(52) U.S. Cl.
CPC ............ *G06F 1/3296* (2013.01); *G06F 1/263* (2013.01); *G06F 1/305* (2013.01); *G06F 1/3206* (2013.01); *G06F 1/3287* (2013.01); *G06F 3/0619* (2013.01); *G06F 3/0647* (2013.01); *G06F 3/0685* (2013.01); *G06F 11/1458* (2013.01)

(58) Field of Classification Search
CPC ........ G06F 1/3296; G06F 1/263; G06F 1/305; G06F 1/3206; G06F 1/328; G06F 3/0647; G06F 11/1458
USPC ....................................................... 713/320
See application file for complete search history.

(56) References Cited

U.S. PATENT DOCUMENTS

| | | | | |
|---|---|---|---|---|
| 4,959,774 A | * | 9/1990 | Davis | ........................ G06F 1/30 365/228 |
| 2006/0080515 A1 | * | 4/2006 | Spiers | ................. G06F 11/1441 711/162 |
| 2006/0288243 A1 | * | 12/2006 | Kim | ...................... G06F 1/3203 713/300 |
| 2007/0118773 A1 | * | 5/2007 | Tsuji | ..................... G06F 1/3203 713/300 |
| 2014/0133257 A1 | * | 5/2014 | Ahn | ........................ G11C 5/141 365/229 |
| 2015/0089255 A1 | * | 3/2015 | Jurski | ..................... G06F 1/329 713/320 |

(Continued)

*Primary Examiner* — Terrell S Johnson
(74) *Attorney, Agent, or Firm* — Amin, Turocy & Watson, LLP

(57) ABSTRACT

Data storage system power shedding for vaulting and/or backup is provided herein. A data storage system can include a processor that executes computer-executable components, at least one memory, and a basic input/output system device that stores respective ones of the computer-executable components executed by the processor. The computer-executable components comprise a power monitor component that monitors an input alternating current power level of the data storage system, a processor management component that causes the processor to transition from a multiple-core operating mode to a single-core operating mode in response to an indication from the power monitor component that the input AC power level has decreased below a threshold, and a backup component that initiates a transfer of data stored by the at least one memory to at least one backup storage device in response to the processor being configured to operate in the single-core operating mode.

15 Claims, 12 Drawing Sheets

(56) References Cited

U.S. PATENT DOCUMENTS

2017/0147060 A1* 5/2017 Chen .................. G06F 1/263

* cited by examiner

DATA STORAGE SYSTEM POWER SHEDDING FOR VAULT

TECHNICAL FIELD

The subject application is related to data storage, and more particularly, to techniques for managing data protection in a data storage system.

BACKGROUND

As computing technology has advanced over time, so too has the amount and scope of data that can be maintained and analyzed via computer systems. For instance, the ability to manage very large data sets, commonly known as big data, has led to significant advances in fields such as manufacturing, media, science, and e-commerce, among many others. Data storage systems, such as those utilized in network-attached storage (NAS) platforms, provide the means by which these large sets of data can be maintained in an efficient and reliable way. For instance, data storage systems can utilize one or more data protection techniques to prevent loss of data stored by volatile and/or non-volatile memory in the event of power failure and/or other events that could adversely impact system functionality.

SUMMARY

The following summary is a general overview of various embodiments disclosed herein and is not intended to be exhaustive or limiting upon the disclosed embodiments. Embodiments are better understood upon consideration of the detailed description below in conjunction with the accompanying drawings and claims.

In an aspect, a data storage system is described herein. The data storage system includes at least one processor that executes computer-executable components, at least one memory, and a basic input/output system (BIOS) device that stores respective ones of the computer-executable components executed by the at least one processor. The computer-executable components include a power monitor component that monitors an input alternating current (AC) power level of the data storage system, a processor management component that causes the processor to transition from a multiple-core operating mode to a single-core operating mode in response to an indication from the power monitor component that the input AC power level has decreased below a threshold, and a backup component that initiates a transfer of data stored by the at least one memory to at least one backup storage device in response to the processor being configured to operate in the single-core operating mode.

In another aspect, a method is described herein. The method includes monitoring an input AC power level of a system including at least one processor and at least one memory, transitioning the at least one processor of the system from a multiple-core operating mode to a single-core operating mode in response to the input AC power level being determined to have decreased below a threshold, and initiating a transfer of data stored by the at least one memory of the system to at least one backup storage device in response to the transitioning.

In an additional aspect, an alternative data storage system is described herein. The data storage system includes a processor module, at least one local data device, a voltage monitoring device that monitors an input AC power level at the processor module, a power management circuit that reduces power usage of the processor module in response to an indication from the voltage monitoring device that the input AC power level at the processor module has fallen below a threshold, and a BIOS device that instructs the processor module to initiate a transfer of data stored by the at least one local data device to a remote disk storage system in response to the indication from the voltage monitoring device.

DESCRIPTION OF DRAWINGS

Various non-limiting embodiments of the subject disclosure are described with reference to the following figures, wherein like reference numerals refer to like parts throughout unless otherwise specified.

DETAILED DESCRIPTION

Various specific details of the disclosed embodiments are provided in the description below. One skilled in the art will recognize, however, that the techniques described herein can in some cases be practiced without one or more of the specific details, or with other methods, components, materials, etc. In other instances, well-known structures, materials, or operations are not shown or described in detail to avoid obscuring certain aspects.

Figure 1:
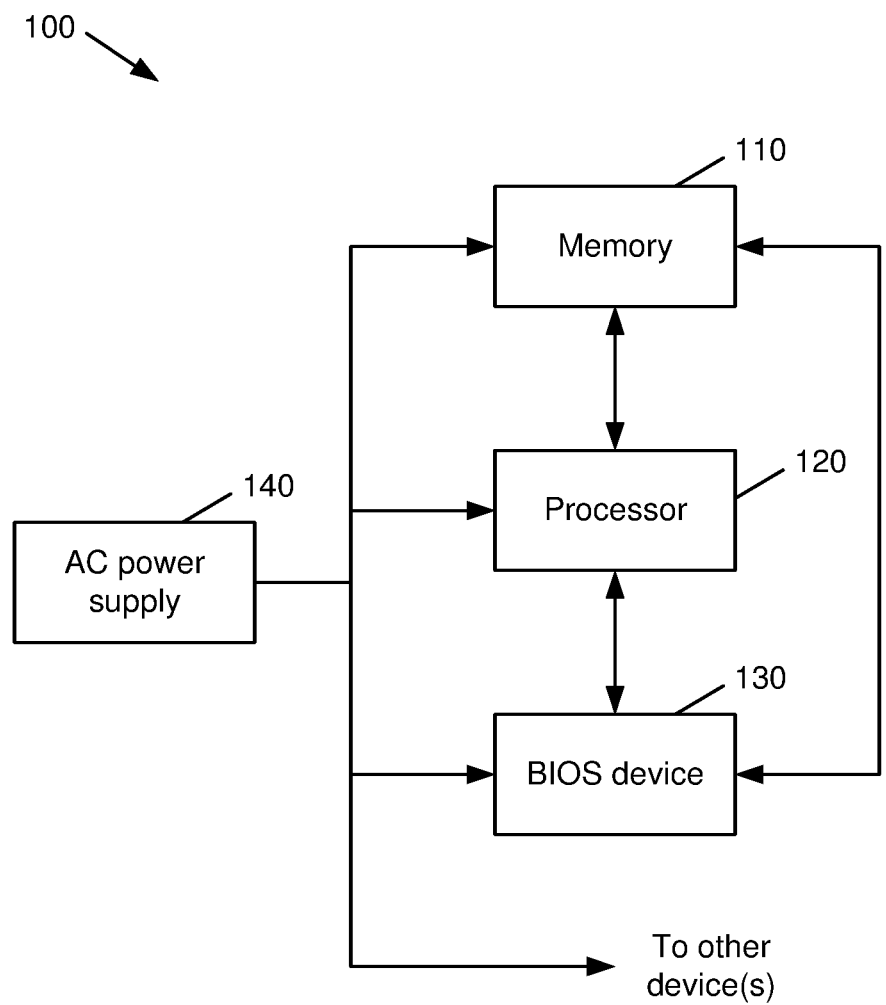
FIG. 1 is a block diagram of a system that facilitates data backup functionality in a data storage system in accordance with various aspects described herein.

Referring first to FIG. 1, a system 100 that facilitates data backup functionality in a data storage system in accordance with various aspects described herein is illustrated. In an aspect, system 100 can be, or can be implemented as part of, a network-attached storage (NAS) platform and/or other computing platforms on which data sets of varying scope and/or size are desirably stored. As shown in FIG. 1, system 100 can include at least one memory 110, at least one processor 120, and a basic input/output system (BIOS) device 130, which can collectively operate to maintain stored data and/or perform other suitable computing tasks. As further shown by FIG. 1, system 100 further includes an alternating current (AC) power supply 140 that provides operational power to the memory 110, processor 120, BIOS device 130, and/or other devices of system 100. In addition to the devices shown in FIG. 1, the AC power supply 140 can additionally provide power to one or more other devices, such as a disk storage controller (e.g., a Serial AT Attachment (SATA) controller, a Small Computer System Interface (SCSI) controller, a Serial Attached SCSI (SAS) controller, etc.), an input/output controller, and/or other devices.

In an aspect, the memory 110 can include volatile and/or non-volatile computer-readable storage media that can be configured to store data, computer-executable instructions, and/or other information associated with operation of the processor 120 and system 100 as a whole.

In another aspect, system 100 can include one processor 120 or multiple processors 120, e.g., operating as a processor cluster and/or according to any other suitable multi-processor architecture. Each of the processors 120, in turn, can contain one or more processor cores that can execute operations independently or in tandem with other cores and/or processors. In an aspect, the processor(s) 120 can additionally include one or more caches and/or other temporary data stores that can hold information relating to the operation of the processor(s) 120 and/or memory 110.

The BIOS device 130 can include one or more chips or other physical structures that provide non-volatile storage for firmware and/or other data that facilitate the low-level operation of system 100. Also, or alternatively, the BIOS device 130 can be configured to execute stored firmware and/or other instructions, either directly or indirectly via the processor 120, in order to direct and/or otherwise manage the operation of the memory 110, processor 120, and/or other physical components of system 100. In an aspect, instructions stored by the BIOS device 130 can function as computer-executable components which, when executed by the processor 120, the BIOS device 130, and/or devices of system 100, cause the device(s) executing the computer-executable components to implement the functionality of those components. Various examples of computer-executable components that can be implemented via the BIOS device 130 are described in further detail in the respective embodiments that follow.

In an aspect, the BIOS device 130 can be implemented as part of a baseboard, motherboard, and/or other hardware component that facilitates communication between the respective devices of system 100. For instance, the BIOS device 130 in some embodiments can be a chip that is integrated into the baseboard that provides low-level instructions to other devices of system 100 using connections between those devices established via the baseboard. In another aspect, the BIOS device 130 can store firmware and/or other information via flash memory and/or other types of rewritable storage to enable updates to the firmware stored by the BIOS device via a specialized procedure (e.g., "flashing").

In another aspect, system 100 can interface with one or more data storage devices (not shown), such as hard disk drives, solid state drives, or the like, that provide data storage capability in association with system 100. These data storage devices can be implemented as individual devices and/or collections of devices, which can be physically arranged (e.g., using structures such as racks, sleds, etc.) and/or logically arranged (e.g., as a disk array and/or another suitable logical configuration). Physical and/or logical arrangements of multiple data storage devices can include devices of uniform type and/or capacity as well as devices of different types and/or capacities. In an aspect, respective data storage devices can be physically and/or logically implemented separately from system 100, and system 100 can interface with the data storage devices via a disk interface board and/or any other means by which respective components of system 100 can be operatively coupled to the data storage devices.

In addition to the data storage devices as described above, system 100 may itself be associated with one or more local data storage devices. For instance, system 100 can include a local solid state drive and/or other local disk storage device to store operating system data, application data, and/or any other information utilized by system 100 in its course of operation.

In an aspect, system 100 can function as a complete data storage system and/or as a subsection of a larger system. For instance, system 100 as shown in FIG. 1 can, in some embodiments, be a computing node, module, and/or other subdivision of a larger data storage system that also includes other instances of system 100 and/or other computing nodes, modules, systems, etc. In an embodiment of a data storage system that includes multiple computing nodes, separate AC power supplies 140 can be provided for respective computing nodes, or a common AC power supply 140 can be utilized by multiple or all computing nodes of the data storage system. Similarly, a common disk interface and/or other means can be utilized to enable each of the respective computing nodes to access all connected data storage devices, or alternatively the data storage devices can be partitioned such that a first set of computing nodes interfaces with a first set of data storage devices, a second set of computing nodes interfaces with a second set of data storage devices, and so on. Other configurations could also be used.

As noted above, system 100 provides a computing interface to enable reading to, writing from, and/or otherwise accessing information stored on one or more data storage devices of a data storage system, such as that associated with an NAS platform. To this end, the system 100, via the processor 120, can generate and/or otherwise maintain system data. In an aspect, system data associated with system 100 can be stored on volatile memory, e.g., the memory 110, to facilitate expedited access to the system data.

In the event of an AC power loss, data stored on volatile memory can be lost if power flow to the memory is interrupted. To prevent this loss of data, system 100 can implement a backup (vaulting) procedure to back up system data stored on volatile memory to a non-volatile data storage device, e.g., a backup drive or the like. In an aspect, a battery backup unit (BBU) can be present in system 100 to enable backup operations in the event of a power loss or upon the occurrence of other events. However, size constraints and/or other factors can in some cases render the BBU unable to provide enough power for full system operation in the absence of input AC power. Accordingly, various embodiments described herein provide techniques by which power consumption of system 100 can be reduced (shed) in order to facilitate backup operations at a power level that can be sustained by a small, compact BBU.

In an aspect, the BIOS device 130 can implement (e.g., store and/or execute) one or more computer-executable components to facilitate power management and data protection as described above, e.g., to direct backup operations via system 100 in the event of an AC power loss. Respective computer-executable components that can be implemented by the BIOS device 130 are illustrated by FIG. 2.

Figure 2:
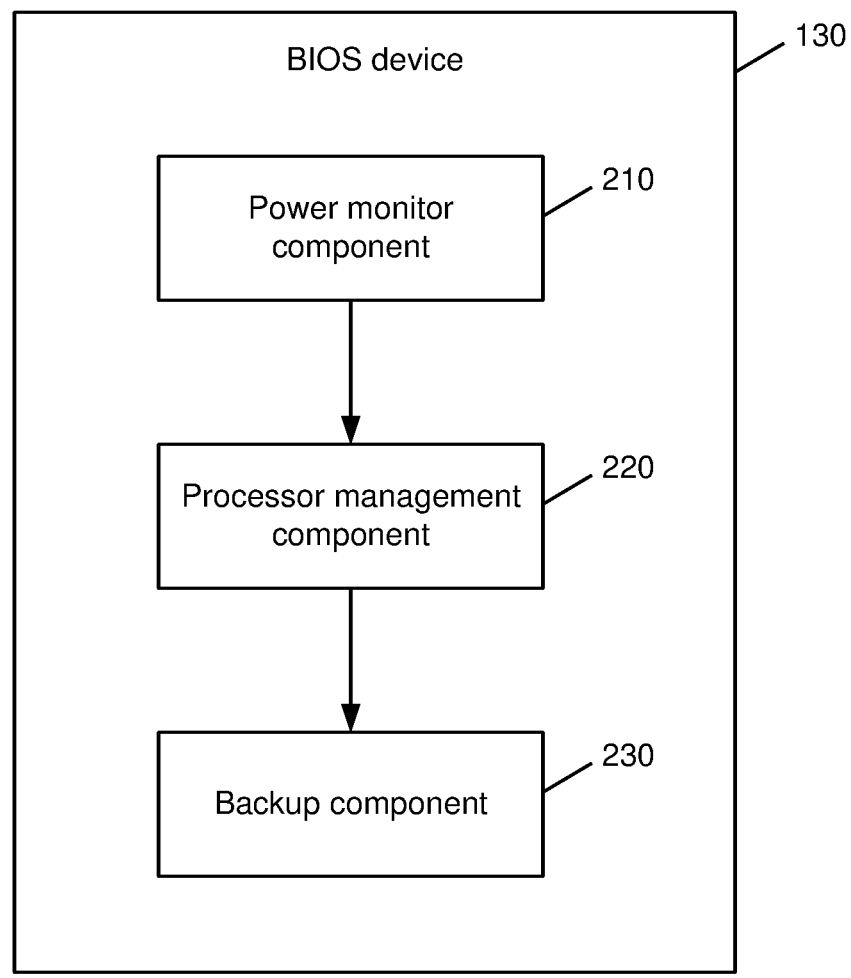
FIG. 2 is a block diagram depicting respective computer-executable components that can be implemented by the BIOS device of FIG. 1 for power management and data protection in accordance with various aspects described herein.

As shown in FIG. 2, and with further reference to FIG. 1, the bios device 130 can be utilized to implement a power monitor component 210 that monitors an input AC power level of system 100, e.g., a power level associated with the AC power supply 140. In an aspect, the power monitor component 210 can facilitate monitoring of the input AC power level of the data storage system via an input power rail operatively coupled to the processor 120, e.g., a 12-volt rail associated with the processor 120.

The BIOS device 130 can further be utilized to implement a processor management component 220 that causes the processor 120 to transition from a multiple-core operating mode to a single-core operating mode in response to an indication from the power monitor component 210 that the input AC power level has decreased below a threshold. The threshold utilized by the power monitor component 210 can be a static threshold and/or a dynamic threshold that can be modified based on power load of the data storage system or other factors. Additionally, the threshold can be set based on one or more metrics. For instance, the threshold can be set based on a specified minimum operating voltage of the memory 110, a probability of data loss associated with operation of the memory 110 at respective power levels, etc. Other means for setting the threshold power level could also be used.

As further shown by FIG. 2, the BIOS device 130 can also be utilized to implement a backup component 230 that initiates a transfer of data stored by the memory 110 to at least one backup storage device, e.g., by the processor 120, in response to the processor 120 being configured to operate in the single-core operating mode. In an aspect, the processor 120 can be further subject to operational restrictions by the BIOS device 130, e.g., a throttled effective processing rate, a power usage restriction, etc., at various points in the backup process, as described in further detail below.

Figure 3:
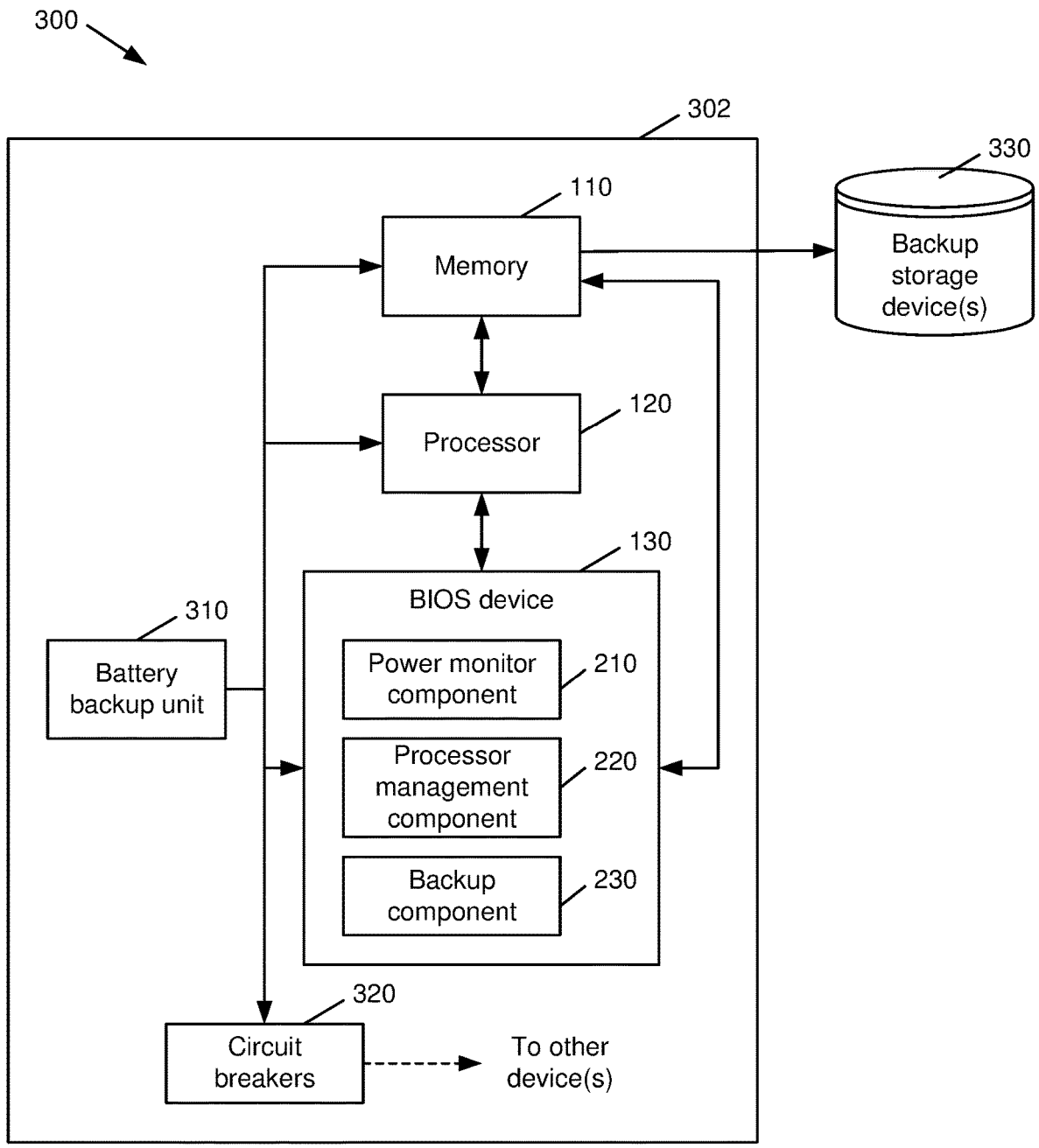
FIG. 3 is a block diagram depicting low-power backup functionality that can be implemented by a data storage system in accordance with various aspects described herein.

FIG. 3 illustrates a block diagram of a system 300 that can utilize low-power backup functionality as facilitated by the BIOS device 130 as described above, e.g., in the event of a loss of system AC power. Repetitive descriptions of like parts described in previous embodiments herein is omitted for the sake of brevity. As shown by FIG. 3, in the event of an AC power failure and/or other event causing loss of input AC power to a computing node 302 of a data storage system, the computing node 302 can receive power from a BBU 310. To accommodate the lower amount of power provided by the BBU 310 as compared to the AC power supply 140, the BIOS device 130 can facilitate reduction of the amount of power utilized by the processor 120 in connection with backing up data stored on volatile system memory to one or more backup storage devices 330 and/or other appropriate operations. While the backup storage device(s) 330 are illustrated in system 300 as being external to the computing node 302, it should be appreciated that the backup storage device(s) 330 could also be implemented as one or more drives, flash memory modules, etc., within the computing node 302.

As further shown in FIG. 3, the computing node 302 can include at least one circuit breaker 320 that disengages in response to the AC power level to the computing node 302 falling below the threshold set by the power monitor component 210. Disengagement of the circuit breaker(s) 320, in turn, can result in prevention of power flow to at least one device of the computing node 302 and/or the data storage system as a whole. For instance, one or more devices that are not utilized for vaulting or backup, such as an input/output controller, a disk interface controller, and/or other devices, can be powered down via the circuit breaker(s) 320 upon the computing node 302 losing AC power.

Figure 4:
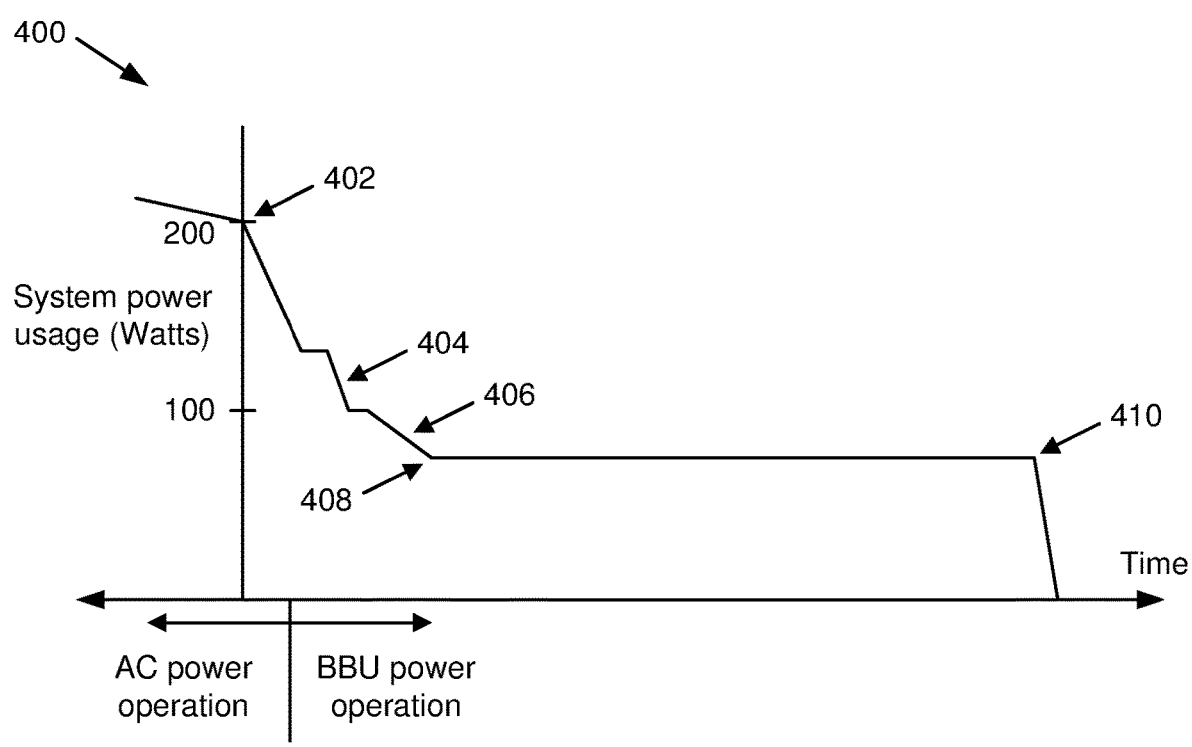
FIG. 4 is a graph depicting power usage by a data storage system over time during a power shedding procedure in accordance with various aspects described herein.

Diagram 400 in FIG. 4 depicts the power usage of a data storage system and/or a data storage system computing node, e.g., computing node 302 in system 300, over time in the event of an AC power loss. It should be appreciated that the specific power measurements illustrated in diagram 400 at respective points in time are provided merely as non-limiting examples, and other power usage schemes could also be used. It should be further appreciated that diagram 400 is not drawn to scale and that, where appropriate, slopes associated with various time segments as shown by diagram 400 have been modified (e.g., increased or reduced) for illustrative effect.

At time 402, an AC power failure is detected. In an aspect, the AC power failure can be detected when the power monitor component 210 and/or another voltage monitoring device indicates a loss of AC power as defined by, e.g., a power level on the main 12-volt rail of the processor 120 dropping below a set threshold. Additionally, in response to the power loss indication given at time 402, the processor 120 can be throttled (e.g., by the processor management component 220), causing the effective processing rate of the processor 120 to drop from a first processing rate to a second processing rate that is lower than the first processing rate. In an aspect, the processor 120 can be throttled by lowering the internal clock rate of the processor 120 and/or by other means. As a result of the effective processing rate of the processor 120 being lowered, the power consumed by the processor 120 can be lowered in response to the AC power failure to facilitate further backup-related actions.

At time 404, the circuit breakers 320 as shown in FIG. 3 disengage and/or otherwise isolate components that are not utilized in the backup process, such as drives, drive controllers, input/output controllers, etc., from the power provided by the BBU 310, thereby further reducing system power usage.

At time 406, the BIOS device 130, a baseboard management controller (BMC), and/or other suitable device initiates the backup process (e.g., via the backup component 230). Further at time 406, the BMC and/or another component can issue an interrupt to the processor 120. In response, the BIOS device 130 can place the processor 120 in a sleep state and reduce the number of processor cores utilized by the processor 120 to one. Stated another way, the processor management component 220 of the BIOS device 130 can respond to the interrupt issued to the CPU and/or other instructions by causing the processor 120 to transition from a multiple-core operating mode to a single-core operating mode. In an aspect, the processor 120 can be placed into the single-core operating mode further in response to disengagement of the circuit breakers 320 at time 404, as shown by diagram 400. Alternatively, the processor 120 can be placed into the single-core operating mode before, or in parallel with, disengagement of the circuit breakers 320.

At time 408, in response to the processor 120 being placed into the single-core operating mode, the throttling imposed on the processor 120 at time 402 is removed. Subsequently, the processor 120 can operate in the single-core mode at its original clock rate to store respective data located in volatile memory (e.g., RAM (random access memory), processor caches, etc.) to one or more non-volatile storage devices. Upon successful storage of the data in non-volatile storage, the system can then be shut down pending return of AC power at time 410.

In an aspect, the power reduction operations described above with respect to diagram 400 can result in reduced power usage of the system, e.g., a reduction in power of approximately 65% over standard operation. In this manner, vaulting and/or other backup operations can be performed by a data storage system using a compact BBU 310 that is tailored to constrained platform space while maintaining the integrity of stored system data.

Figure 5:
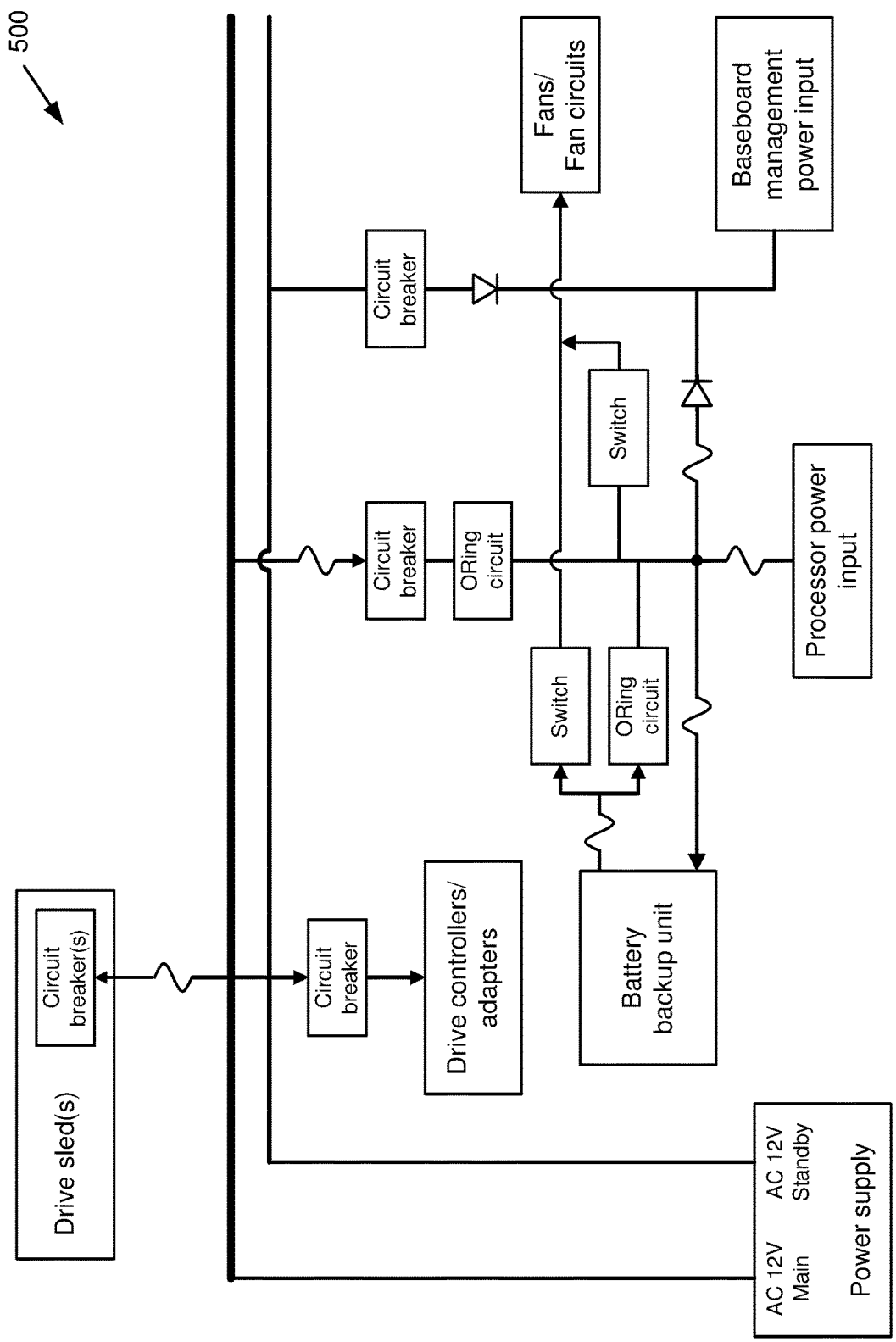
FIG. 5 is a simplified schematic diagram depicting an example data storage system operating in a full-power operating mode in accordance with various aspects described herein.

With reference next to FIG. 5, a simplified schematic diagram 500 depicting an example data storage system operating in a full-power operating mode in accordance with various aspects described herein is illustrated. As shown by diagram 500, main power to the data storage system is provided via an AC power supply that outputs power via main and standby 12-volt rails. The main and standby power rails, in turn, convey power to the drive sleds and/or other storage devices of the data storage system as well as various components of respective computing nodes in the system. In an aspect, the main and standby power rails shown in diagram 500 can be configured such that the main power rail provides a constant power flow to respective components of the data storage system while the standby rail can be configured to deliver additional power on an as-needed basis. Other configurations are also possible.

The AC power supply shown in diagram 500 can be a localized power supply for a particular computing node or a general power supply that provides power to some or all computing nodes in the system. In either case, power provided by an AC power supply can be provided to a computing node as shown by diagram 500 as well as one or more peer nodes in the system. In the case of localized per-node power supplies, power provided at a first node can additionally be conveyed to a second node in order to provide redundancy and/or otherwise increase the resilience of the system to failure of a single power supply. In an aspect, power rails and/or other power connections between computing nodes and/or drive sleds or other storage structures of the system can be situated on a midplane of an enclosure of the data storage system and/or physically arranged in any other suitable manner.

As additionally shown in diagram 500, circuit breakers can be placed at respective points of the data storage system in order to regulate power flow to respective devices of the system. In an aspect, the circuit breakers shown in diagram 500 can be, or can include the functionality of, an electronic circuit breaker that functions as a switch controlled by a voltage monitor. In the event of an AC power failure or other loss of AC power, the circuit breakers can be configured to detect the loss of AC power and isolate their corresponding devices.

Figure 6:
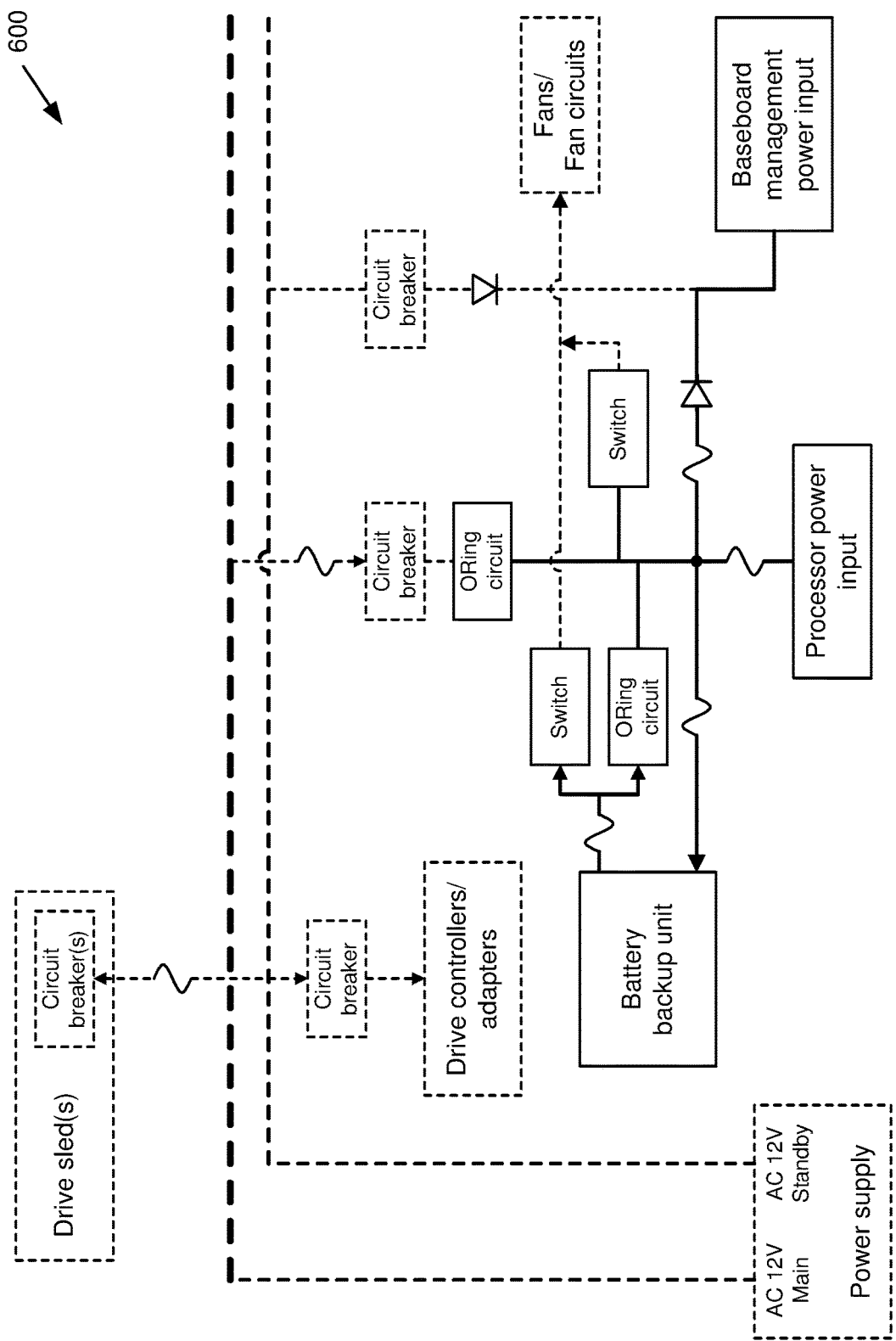
FIG. 6 is a simplified schematic diagram depicting the example data storage system of FIG. 5 operating in a reduced-power operating mode in accordance with various aspects described herein.

In the event of AC power loss, the circuit breakers can prevent the flow of power to one or more components of the system, as shown by diagram 600 in FIG. 6. Dashed lines are utilized in FIG. 6 to indicate system components for which power flow is prevented by the circuit breakers during a loss of AC power. As described above with respect to various other embodiments, the circuit breakers in diagram 600 function to isolate respective devices and/or circuits, such as drive controllers and/or adapters, fans and/or fan circuits, drive sleds and associated storage devices, etc., from power provided by the BBU in order to reduce system power usage for vaulting and/or other backup operations. An ORing circuit, as further shown by diagram 600, can also be utilized to control access to power provided by the BBU in cases of AC power loss.

In an aspect, disengagement of the circuit breakers as shown by diagram 600 can result in initiation of backup of volatile memory contents by one or more processors as described above. Here, the baseboard management controller can be configured to detect, via a corresponding power input, isolation from the AC power supply by the circuit breakers as a result of power loss. The baseboard management controller can, in turn, initialize a backup procedure using power supplied by the BBU.

Figure 7:
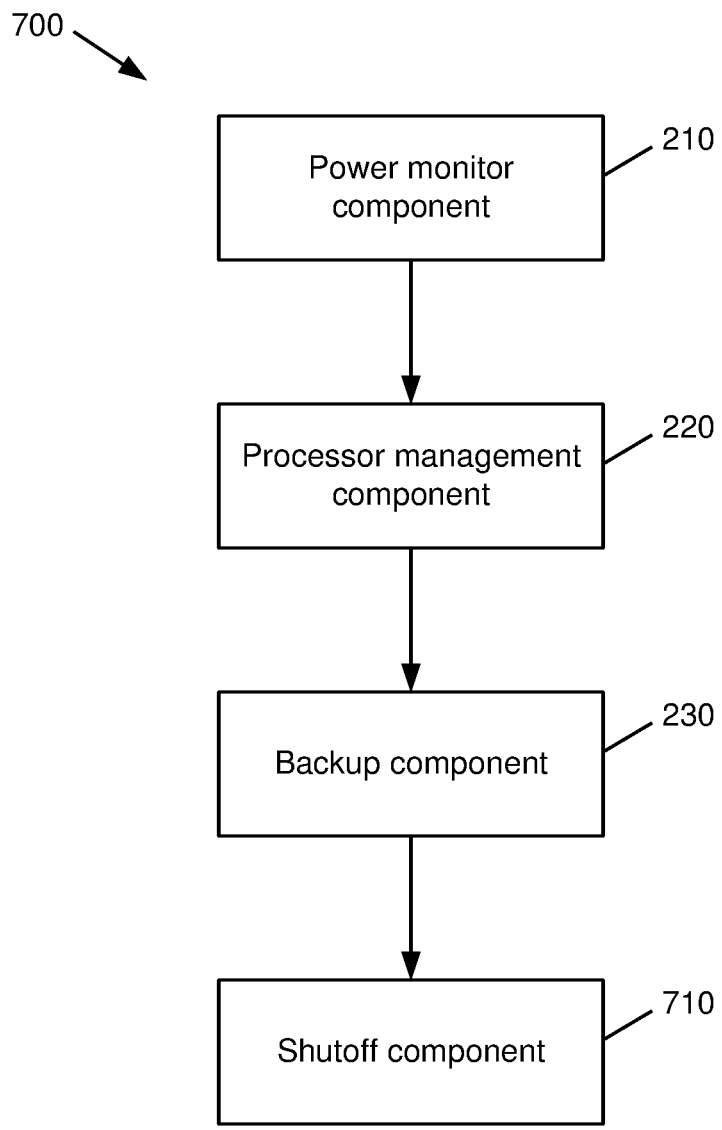
FIG. 7 is a block diagram of a system that facilitates power shedding and system shutoff in connection with data backup in a data storage system in accordance with various aspects described herein.

With reference next to FIG. 7, a block diagram of a system 700 that facilitates power shedding and system shutoff in connection with data backup in a data storage system is illustrated. Repetitive descriptions of like parts described in previous embodiments herein is omitted for the sake of brevity. As shown in FIG. 7, system 700 includes a power monitor component 210, a processor management component 220, and a backup component 230, which can be utilized (e.g., by a processor 120 and/or a BIOS device 130) to store contents of volatile memory to one or more non-volatile data stores in the event of power loss as described above with respect to FIG. 2. Additionally, system 700 includes a shutoff component 710 that places the data storage system in a powered off state in response to completion of the transfer initiated by the backup component, e.g., as described above with respect to time 410 of diagram 400. In an aspect, the data storage system can be placed in the powered off state upon completion of vaulting or other backup operations to prevent additional load to the BBU 310. Upon the return of AC power, the data storage system can be powered on either manually or automatically, e.g., in response to detecting that AC power has returned.

Figure 8:
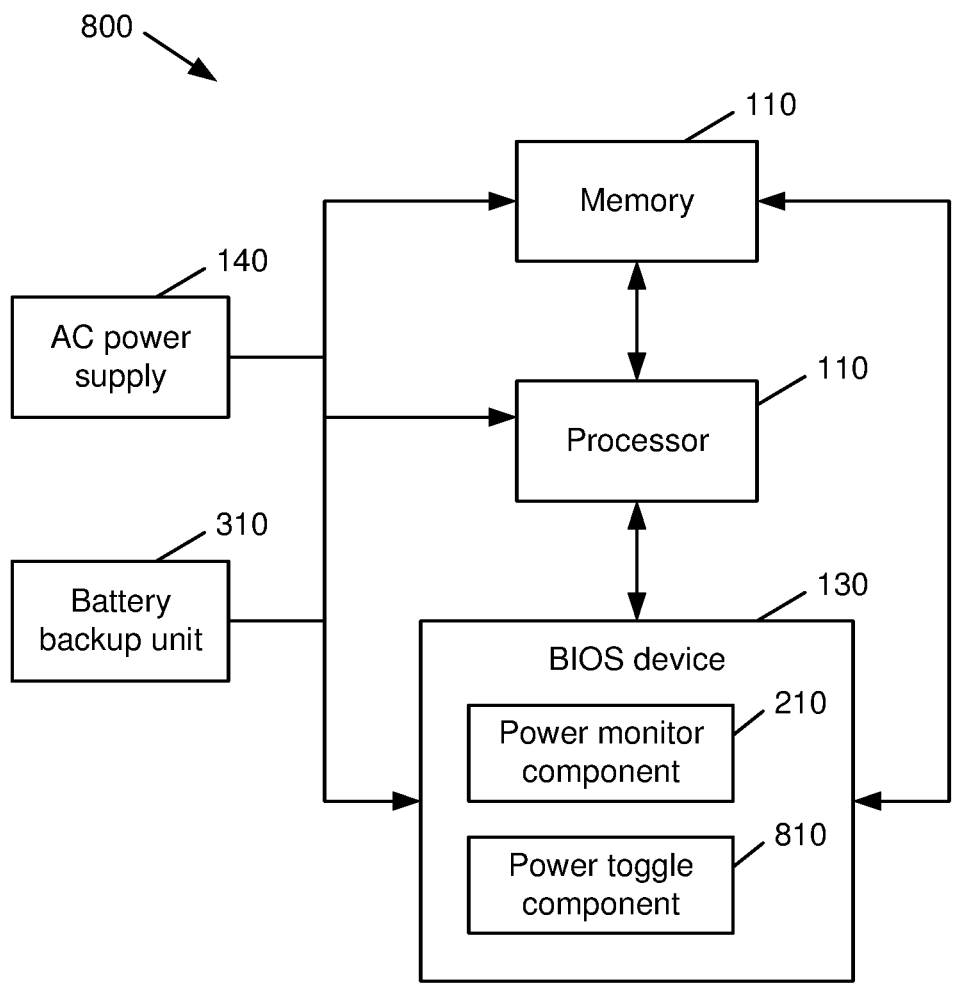
FIG. 8 is a block diagram of a data storage system that facilitates toggling of system power between respective power sources in accordance with various aspects described herein.

With reference next to FIG. 8, a block diagram of a system 800 that facilitates toggling of system power between respective power sources is illustrated. Repetitive descriptions of like parts described in previous embodiments herein is omitted for the sake of brevity. As shown in FIG. 8, system 800 includes a power toggle component 810 implemented by the BIOS device 130 that can select a power input for respective components of system 800 from among multiple sources, e.g., an AC power supply 140 and/or a BBU 310. In an aspect, the power toggle component 810 can be utilized to change a power input for system 800 from an AC power source, e.g., the AC power supply 140, to at least one battery, e.g., one or more batteries of the BBU 310, in response to an indication by the power monitor component 210 that AC power has been lost.

In the event that AC power returns before completion of backup operations as described above, the processor 120 can be configured to continue the backup, i.e., such that the backup process is not interrupted upon the return of AC power. In this case, the power toggle component 810 can further change the power input of system 800 from the BBU 310 back to the AC power supply 140. In an aspect, system power can be transitioned back to the AC power supply 140 in response to a further indication from the power monitor component 210 that the input AC power level to the system has been restored prior to completion of data transfer associated with the backup process.

While the power toggle component 810 is illustrated in FIG. 8 as a computer-executable component implemented by the BIOS device 130, other implementations could also be used. For instance, the power toggle component 810 could be implemented as, or as part of, an ORing circuit as shown by diagrams 500 and 600. Further implementations are also possible.

Figure 9:
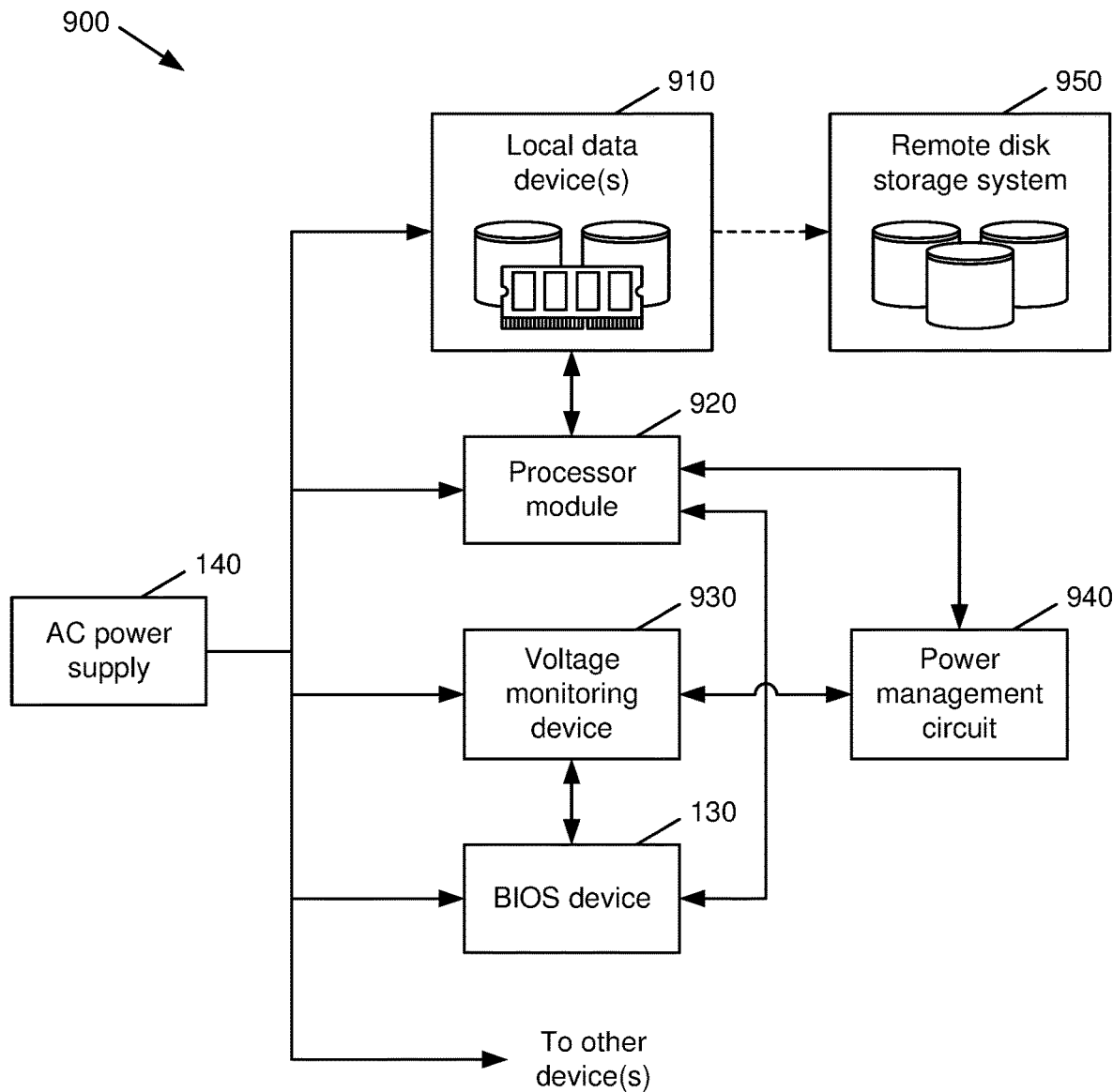
FIG. 9 is a block diagram of an alternative system that provides data backup functionality for a data storage system in the event of power loss in accordance with various aspects described herein.

Turning now to FIG. 9, a block diagram of an alternative system 900 that provides data backup functionality for a data storage system in the event of power loss in accordance with various aspects described herein is illustrated. Repetitive descriptions of like parts described in previous embodiments herein is omitted for the sake of brevity. As shown in FIG. 9, system 900 includes one or more local data devices 910. In an aspect, the local data devices 910 can include volatile memory, e.g., a memory 110 as described above with respect to FIG. 1. Also, or alternatively, the local data devices 910 can include respective non-volatile storage devices, such as local hard drives, flash memory arrays, and/or other storage disks or devices that are local to a computing node of a data storage system, disk drives or other data storage devices arranged in drive racks, sleds, or the like that interface with system 900 via a disk interface, and/or other suitable devices.

In an aspect, the local data devices 910, and/or other components of system 900 as described below, can interface with a processor module 920 that provides computing functionality for system 900. The processor module 920 can include one or more processors, each of which can utilize one or more processor cores, as described above with respect to processor 120 in FIG. 1.

System 900 further includes a voltage monitoring device 930 that monitors an input AC power level of system 900, e.g., an input power level provided by an AC power supply 140. As further shown by FIG. 9, the voltage monitoring device 930 can be operatively coupled to a power management circuit 940 that can reduce power usage of the processor module 920 in response to an indication from the voltage monitoring device 930 that the input AC power level at the processor module 920 has fallen below a threshold, and/or upon any other suitable indication of AC power loss at system 900. While the voltage monitoring device 930 and the power management circuit 940 are illustrated in FIG. 9 as separate entities, it should be appreciated the functionality of the voltage monitoring device 930 and the power management circuit 940 can in some embodiments be performed by the same physical structure. For instance, the voltage monitoring device 930 and the power management circuit 940 can be implemented via one or more electronic circuit breakers and/or ORing circuits, such as those described above with respect to diagrams 500 and 600. Other implementations could also be used.

System 900 additionally includes a BIOS device 130 that instructs the processor module 920 to initiate a transfer of data stored by the local data device(s) 910 to a remote disk storage system 950 in response to the indication from the voltage monitoring device 930. In an aspect, the BIOS device 130 can include one or more computer-executable components and/or other functionality that is similar to functionality described with respect to the various embodiments set forth above, and/or other functionality.

Figure 10:
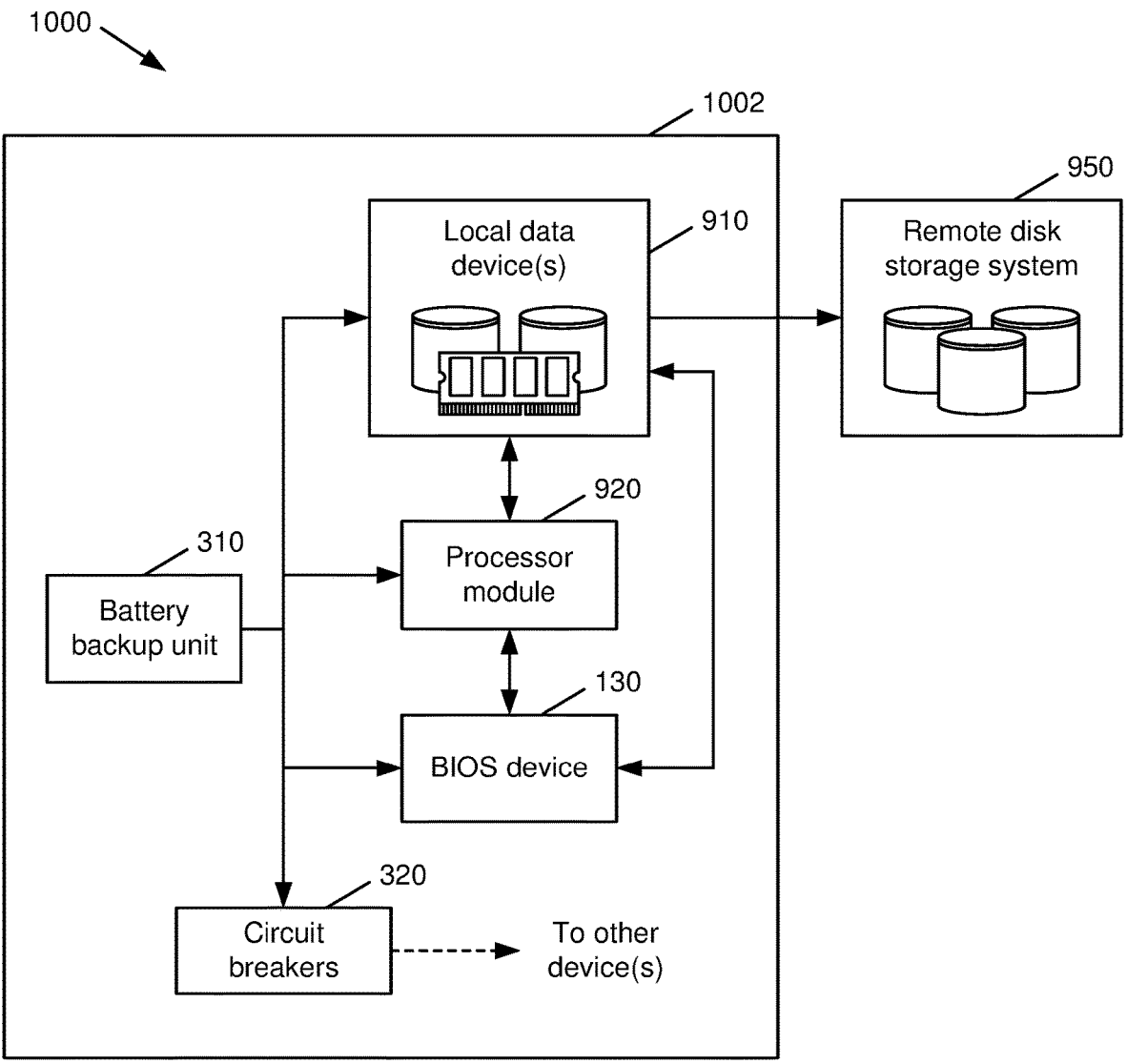
FIG. 10 is a block diagram depicting low-power backup functionality that can be implemented by the data storage system of FIG. 9 in accordance with various aspects described herein.

With reference now to FIG. 10, a block diagram of a system 1000 is illustrated in which the respective components of system 900 are implemented in a computing node 1002 of system 1000. As shown by FIG. 10, the local data device(s) 910, processor module 920, and/or BIOS device 130 can utilize power from a BBU 310 to initiate backup of the data stored at the local data device(s) 910 in the event of a power loss. As described above with respect to FIG. 4, the processor module 920 can be transitioned (e.g., by the BIOS device 130) from a first processing rate to a second processing rate that is lower than the first processing rate in response to the power management circuit 940 reducing the power usage of the processor module 920 at the time of AC power loss.

In an aspect, the power management circuit 940 can include one or more circuit breakers 320 that disengage in response to the input AC power level at the processor module 920 falling below the threshold, resulting in prevention of power flow to at least one additional device of computing node 1002. In response to disengagement of the circuit breakers 320 and/or independently, the BIOS device 130 can further cause the processor module 920 to transition from a multiple-core operating mode to a single-core operating mode, thereby further reducing the power consumption of the processor module 920. In response to the processor module 920 successfully entering the single-core operating mode, the BIOS device can cause the processor module 920 to transition back to its original processing rate in order to complete backup of the data stored by the local data device(s) 910 to the remote disk storage system 950, e.g., as described above with respect to time 408 in diagram 400. In a similar manner to that described above with respect to FIG. 7, the computing node 1002 can be placed in a powered off state upon successful completion of the backup.

Figure 11:
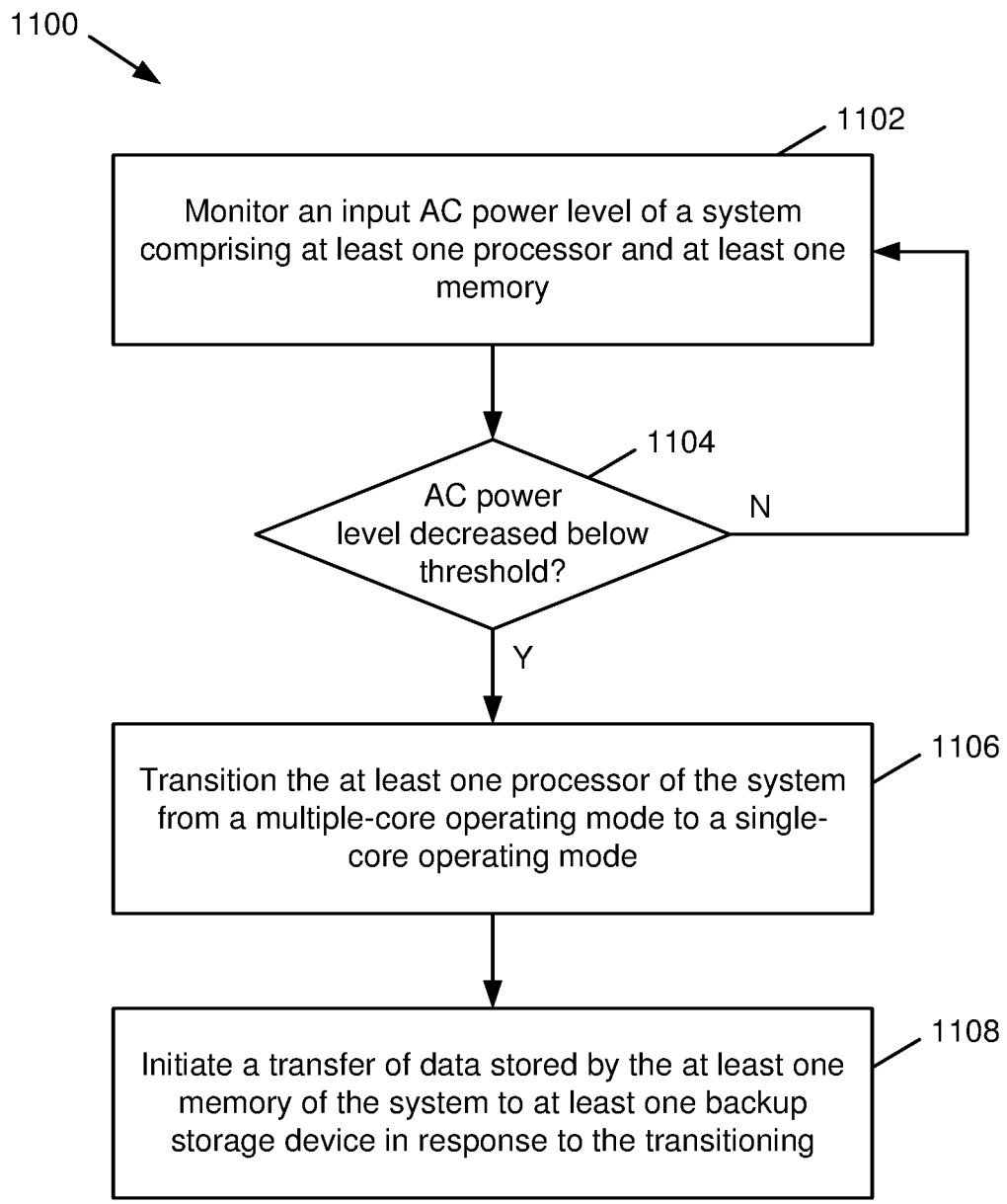
FIG. 11 is a flow diagram of a method that facilitates power management in a data storage system according to various embodiments described herein.

FIG. 11 illustrates a method in accordance with certain aspects of this disclosure. While, for purposes of simplicity of explanation, the method is shown and described as a series of acts, it is to be understood and appreciated that this disclosure is not limited by the order of acts, as some acts may occur in different orders and/or concurrently with other acts from that shown and described herein. For example, those skilled in the art will understand and appreciate that methods can alternatively be represented as a series of interrelated states or events, such as in a state diagram. Moreover, not all illustrated acts may be required to implement methods in accordance with certain aspects of this disclosure.

With reference to FIG. 11, presented is a flow diagram of a process 1100 for power management in a data storage system according to various embodiments described herein. At 1102, an input AC power level of a system that includes at least one processor (e.g., a processor 120) and at least one memory (e.g., a memory 110) can be monitored (e.g., by a power monitor component 210 of a BIOS device 130, a voltage monitoring device 930, and/or a power management circuit 940).

At 1104, if the AC power level monitored at 1102 remains above a set threshold, no further action is taken and the monitoring performed at 1102 can proceed. Otherwise, if the AC power level is determined to have decreased below the threshold, process 1100 continues to 1106, where the at least one processor of the system is transitioned (e.g., by the BIOS device 130 via a processor management component 220) from a multiple-core operating mode to a single core operating mode.

At 1108, in response to the transitioning performed at 1106, a transfer of data stored by the at least one memory of the system to at least one backup storage device (e.g., backup storage device(s) 330) is initiated (e.g., by the BIOS device via a backup component 230).

Figure 12:
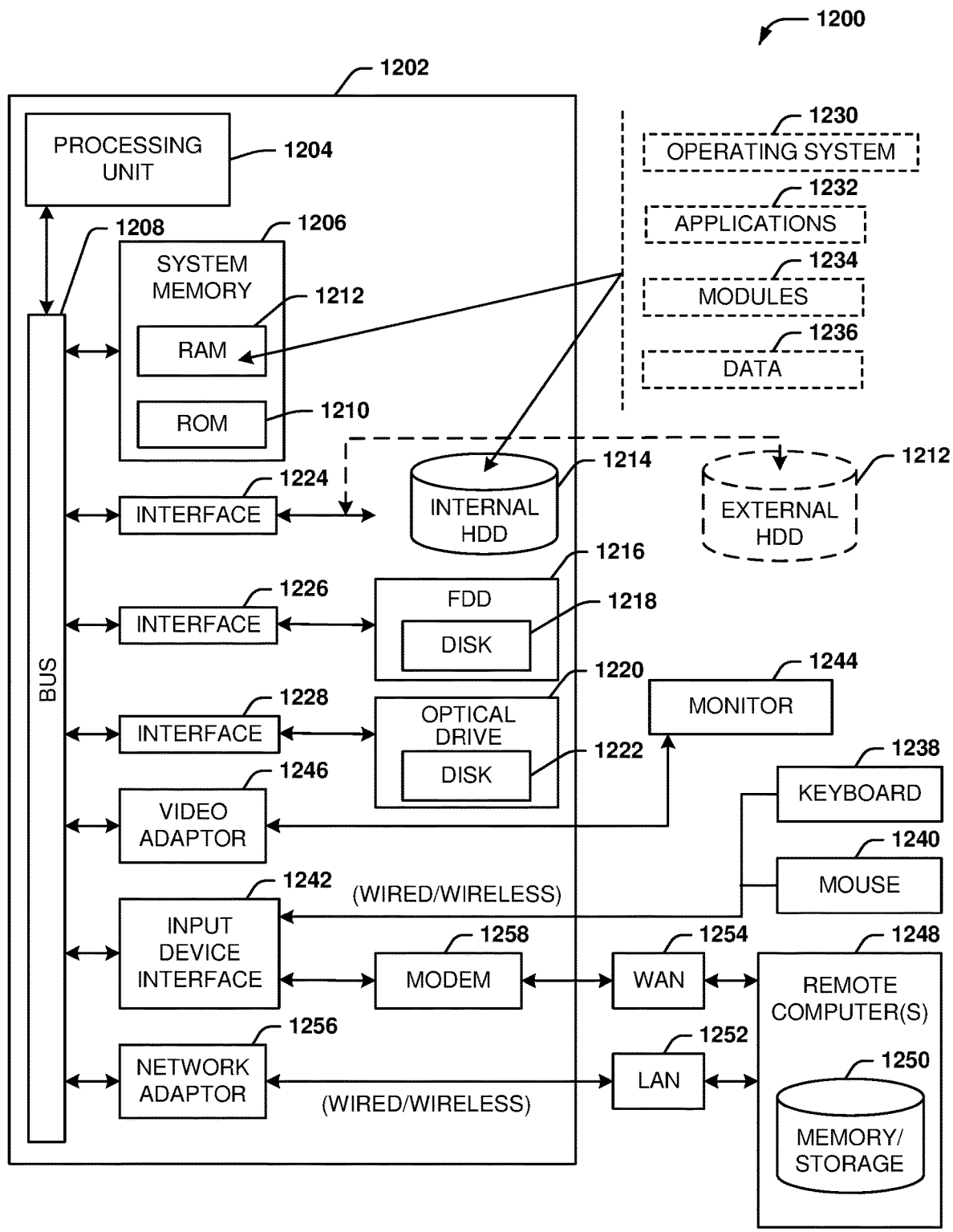
FIG. 12 is a diagram of an example computing environment in which various embodiments described herein can function.

In order to provide additional context for various embodiments described herein, FIG. 12 and the following discussion are intended to provide a brief, general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD-ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). While the internal HDD 1214 is illustrated as located within the computer 1202, the internal HDD 1214 can also be configured for external use in a suitable chassis (not shown). The HDD 1214, magnetic FDD 1216 and optical disk drive 1220 can be connected to the system bus 1208 by an HDD interface 1224, a magnetic disk drive interface 1226 and an optical drive interface 1228, respectively. The interface 1224 for external drive implementations includes at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to an HDD, a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

A user can enter commands and information into the computer 1202 through one or more wired/wireless input devices, e.g., a keyboard 1238 and a pointing device, such as a mouse 1240. Other input devices (not shown) can include a microphone, an infrared (IR) remote control, a joystick, a game pad, a stylus pen, touch screen or the like. These and other input devices are often connected to the processing unit 1204 through an input device interface 1242 that can be coupled to the system bus 1208, but can be connected by other interfaces, such as a parallel port, an IEEE 1394 serial port, a game port, a USB port, an IR interface, etc.

A monitor 1244 or other type of display device can be also connected to the system bus 1208 via an interface, such as a video adapter 1246. In addition to the monitor 1244, a computer typically includes other peripheral output devices (not shown), such as speakers, printers, etc.

The computer 1202 can operate in a networked environment using logical connections via wired and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1252 through a wired and/or wireless communication network interface or adapter 1256. The adapter 1256 can facilitate wired or wireless communication to the LAN 1252, which can also include a wireless access point (AP) disposed thereon for communicating with the wireless adapter 1256.

When used in a WAN networking environment, the computer 1202 can include a modem 1258 or can be connected to a communications server on the WAN 1254 or has other means for establishing communications over the WAN 1254, such as by way of the Internet. The modem 1258, which can be internal or external and a wired or wireless device, can be connected to the system bus 1208 via the input device interface 1242. In a networked environment, program modules depicted relative to the computer 1202 or portions thereof, can be stored in the remote memory/storage device 1250. It will be appreciated that the network connections shown are example and other means of establishing a communications link between the computers can be used.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word–without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A data storage system, comprising:
   a processor that executes computer-executable components;
   at least one memory; and
   a basic input/output system device that stores respective ones of the computer-executable components executed by the processor, wherein the computer-executable components comprise:
      a power monitor component that monitors an input alternating current (AC) power level of the data storage system;
      a processor management component that throttles an effective processing rate of the processor from a first processing rate to a second processing rate that is lower than the first processing rate in response to an indication from the power monitor component that the input AC power level has decreased below a threshold and causes the processor to transition from a multiple-core operating mode to a single-core operating mode in response to the effective processing rate of the processor being throttled; and
      a backup component that returns the effective processing rate of the processor from the second processing rate to the first processing rate and initiates a transfer of data stored by the at least one memory to at least one backup storage device in response to the processor being configured to operate in the single-core operating mode.

2. The data storage system of claim 1, further comprising:
   at least one circuit breaker that disengages in response to the input AC power level decreasing below the threshold, resulting in prevention of power flow to at least one device of the data storage system.

3. The data storage system of claim 2, wherein the processor management component causes the processor to transition from the multiple-core operating mode to the single-core operating mode further in response to disengagement of the at least one circuit breaker.

4. The data storage system of claim 1, wherein the computer-executable components further comprise:
   a shutoff component that places the data storage system in a powered off state in response to completion of the transfer initiated by the backup component.

5. The data storage system of claim 1, wherein the power monitor component monitors the input AC power level of the data storage system via an input power rail operatively coupled to the processor.

6. The data storage system of claim 1, wherein the computer-executable components further comprise:
   a power toggle component that changes a power input of the data storage system from an AC power source to at least one battery in response to the indication by the power monitor component.

7. The data storage system of claim 6, wherein the power toggle component further changes the power input of the data storage system from the at least one battery to the AC power source in response to a further indication from the power monitor component that the input AC power level has been restored prior to completion of the transfer by the backup component.

8. A method, comprising:
   monitoring an input alternating current (AC) power level of a system comprising at least one processor and at least one memory;
   throttling an effective processing rate of the at least one processor from a first processing rate to a second processing rate that is lower than the first processing rate in response to the input AC power level being determined to have decreased below a threshold;
   transitioning the at least one processor of the system from a multiple-core operating mode to a single-core operating mode in response to the effective processing rate of the processor being throttled; and
   returning the effective processing rate of the processor from the second processing rate to the first processing rate and initiating a transfer of data stored by the at least one memory of the system to at least one backup storage device in response to the transitioning.

9. The method of claim 8, further comprising:
   inhibiting power flow to at least one device of the system in response to the input AC power level being determined to have decreased below the threshold,
   wherein the transitioning comprises transitioning the at least one processor from the multiple-core operating mode to the single-core operating mode further in response to the inhibiting.

10. The method of claim 8, wherein the monitoring comprises monitoring the input AC power level of the system via an input power rail operatively coupled to the at least one processor of the system.

11. A data storage system, comprising:
    a processor module;
    at least one local data device;
    a voltage monitoring device that monitors an input alternating current (AC) power level at the processor module;
    a power management circuit that reduces power usage of the processor module by transitioning the processor module from a first processing rate to a second processing rate that is lower than the first processing rate in response to an indication from the voltage monitoring device that the input AC power level at the processor module has fallen below a threshold; and
    a basic input/output system (BIOS) device that instructs the processor module to initiate a transfer of data stored by the at least one local data device to a remote disk storage system in response to the indication from the voltage monitoring device,
    wherein the BIOS device further causes the processor module to transition from a multiple-core operating mode to a single-core operating mode in response to the power management circuit reducing the power usage of the processor module, and wherein the BIOS device further causes the processor module to transition from the second processing rate back to the first processing rate in response to the processor module successfully entering the single-core operating mode.

12. The data storage system of claim 11, wherein the power management circuit comprises a circuit breaker that disengages in response to the input AC power level at the processor module falling below the threshold, resulting in prevention of power flow to at least one device of the data storage system.

13. The data storage system of claim 11, wherein the at least one local data device comprises at least one of a storage disk or a memory.

14. The data storage system of claim 11, wherein the voltage monitoring device monitors the input AC power level of the processor module via an input power rail operatively coupled to the processor module.

15. The data storage system of claim 11, further comprising:
   a battery backup unit that supplies power to the data storage system in response to the input AC power level at the processor module falling below the threshold.

* * * * *